3,564,075
POLYAMIDES WITH IMPROVED TRANSPARENCY CONTAINING POLYVINYL PYRROLIDONE
Karl Heinz Hermann and Kurt Schneider, Krefeld-Bockum, Germany, assignors to Farbenfabriken Bayer Aktiengesellschaft, Leverkusen, Germany, a corporation of Germany
No Drawing. Continuation-in-part of application Ser. No. 624,223, Mar. 20, 1967. This application Mar. 7, 1969, Ser. No. 805,374
Int. Cl. C08g 41/04
U.S. Cl. 260—857                                    4 Claims

ABSTRACT OF THE DISCLOSURE

Polyamides having improved transparency containing 0.001 to 10% by weight of a polyvinyl pyrrolidone having a molecular weight of about 800,000 or higher.

This application is a continuation-in-part of Ser. No. 624,223, filed Mar. 20, 1967, entitled, "Polyamides With Improved Transparency," now abandoned.

This invention relates to polyamides having an improved transparency and to a process for the production of polyamides with improved transparency by the addition of polyvinyl lactams.

Shaped articles of polyamides, such as filaments, fibres, foils, injection moulded articles, etc., often have the disadvantage that owing to the capacity of the polyamides to crystallize, they are not clear and transparent but opaque. It has already been proposed to produce transparent polyamides by use of certain dicarboxylic acids such as isophthalic acid, terephthalic acid, substituted octanoic and nonanoic dicarboxylic acids, naphthalene dicarboxylic acid, cyclohexane dicarboxylic acid, 9,9-bis-(2'-carboxyethyl)-fluorene, etc., and/or certain diamines such as m-xylylene diamine, diaminomethylcyclohexane, 9,9-bis-(3'-aminopropyl)-fluorene, etc. The use of C-alkylated lactams is also known. Generally, transparent polyamides can be prepared by copolymerization of two or more starting materials which form polyamides. The improvement in transparency which is obtained by this procedure is however invariably accompanied by a considerable change in the properties of the polyamide. The melting or softening point is lowered, the solubility and swellability increase, the chemical resistance is reduced and the processing of the product, e.g., in injection moulding machines, is impaired and the mechanical properties are altered as well as other properties.

Thus, for example, although products which are much more transparent than pure polycaprolactam can be obtained by copolymerization of 75% caprolactam and 25% AH salt (salt of adipic acid and hexamethylene diamine), the melting point at the same time drops from about 220° C. for the pure polycaprolactam to about 180° C., the hardness decreases considerably and the products are liable to swell in hot methanol. It has also been proposed to produce transparent polycaprolactam by treating the polyamide granules with a combination of hydrogen halides or their alkali metal salts or alkaline earth salts, metal soaps of long chained fatty acids and long chained aliphatic amines, followed by processing in screw process, injection moulding machines or extruders. This process, however, requires one or two additional processing operations; homogeneous distribution of the additives over the surface of the polycaprolactam granules is often difficult to achieve and the angle of repose of the granules is greatly reduced by the occurrence of the so-called rice grain effect so that, for example, it becomes impossible to use automatic feeding devices by volume or weighfeeder for processing. Furthermore, the transparency of the articles of polycaprolactam is often not sufficient, especially after annealing at high temperatures.

It is also known to add polylactams to polyamides in order to improve their dyeability. For this purpose as a polylactam polyvinyl pyrrolidone has been proposed in a molecular weight range of from 10,000 to 360,000. Polyamides containing polyvinyl pyrrolidone of that molecular weight range do not show a considerable gain in transparency.

It has now been found that the transparency of polyamides can be improved in a simple way without alteration in the other properties such as melting or softening point, resistance to solvents and chemicals, processing mechanical properties, etc., by adding polyvinyl pyrrolidone having a molecular weight of about 800,000 or higher to the polyamide-forming starting materials before or during polymerization or to the polyamide after polymerization.

The polyvinyl pyrrolidone is added to the polyamide-forming starting materials in quantities of 0.001 to 10% by weight, preferably 0.01 to 2% by weight before polymerisation, after which polymerisation may be carried out in known manner either continuously or intermittently. Polymerisation may be carried out either with the addition of acids and/or water and/or compounds which split off water, such as aminocaproic acid or AH salt as catalysts or, in the case of lactams in the absence of water, with alkaline catalysts and if desired with activators such as isocyanates etc.

Polyamide-forming starting materials within the meaning of the invention are dicarboxylic acids and diamines and their polyamide-forming derivatives or aminocarboxylic acids and their polyamide-forming derivatives such as lactams. In particular ε-caprolactam and hexamethylene diammonium adipate may be used as starting materials.

The polyvinyl pyrrolidone may also be mixed with the polyamides during or after polymerisation. For example, the polyvinyl pyrrolidone may be added to the polyamide after it has been re-melted in an extruder during homogenizing. In addition to polyvinyl pyrrolidone the polyamides may also contain the usual additives such as lubricants and mould release agents, heat and light stabilizers, dyestuffs, optical brightening agents, plasticisers, chain cleavage agents and UV absorbents, etc.

The polyamides prepared according to the invention are eminently suitable for the production of transparent articles such as films, foils, hollow articles, bristles and fibres. The following examples illustrate more particularly the invention.

EXAMPLE 1

10 kg. of caprolactam are mixed with 300 g. of ε-aminocaproic acid or AH salt (salt of adipic acid and hexamethylene diamine) as catalyst, 100 g. of caproic acid stearylamide as chain cleavage agent and polyvinyl pyrrolidone of average molecular weight about 1,000,000, and polymerised in the usual manner at temperatures of 260 to 280° C. in an autoclave equipped with stirrer. The polymer melt is then spun in the form of a bristle, chopped up into a granulate and freed from monomer by boiling with water. After drying, the resulting colourless polycaprolactam is processed on a screw-injection moulding machine to wedge shaped articles (length 190 mm.; width 35 mm.; section 0.5 to 2 mm.) which increase in wall section continuously into the direction of the gate. Moulding conditions has been as follows:

Melt temperature—260° C.
Mould temperature—18–22° C.
Injection moulding pressure—60 atmospheric excess pressure
After-pressure—60 atmospheric excess pressure
Pressure head—5 atmospheric excess pressure
Total cycle—about 25 seconds
Rate of screw rotation—90 revs./min.

The results of the experiments are summarised in Table I. The comparative samples 2 and 5 are prepared without the addition of polyvinyl pyrrolidone.

The properties of the polyamide produced with the addition of polyvinyl pyrrolidone are substantially similar, with the exception of the improved transparency, to those of the products produced without polyvinyl pyrrolidone.

layer thickness of 1 mm. while the strips made from the comparative product are transparent only up to 0.7 mm.

EXAMPLE 3

A copolyamide is prepared in the usual way from 8.5 kg. caprolactam and 1.5 kg. 11-amino-undecanoic acid with the addition of 20 g. of polyvinyl pyrrolidone having an average molecular weight of about 1,000,000. After spinning, chopping, extraction and drying, this copolyamide has a relative viscosity of 4.09.

For comparison purposes, a product having a relative viscosity of 4.05 was prepared in the same way without the addition of polyvinyl pyrrolidone. Both products are moulded to round discs of 120 mm. diameter and continuously adjustable thickness in a screw type injection moulding machine.

The following conditions were used in the process:

Injection temperature, starting from the hopper—260°, 250°, 240°
Mould temperature—20° C.
Injection pressure—75 atmospheric excess pressure
After-pressure—70 atmospheric excess pressure
Pressure head—10 atmospheric excess pressure
Total cycle—about 50 seconds
Rate of screw rotation—59 revs./min.

The round discs produced from the product containing polyvinyl pyrrolidone were transparent up to a thickness of 2.3 mm., but those produced from the product not containing polyvinyl pyrrolidone were only transparent up to a thickness of 1.5 mm.

TABLE I

| Serial No.: | Catalyst | Polyvinyl pyrrolidone, weight percent | Relative viscosity of the polyamide | Layer thickness up to which the wedge-shaped strip is transparent, mm. |
|---|---|---|---|---|
| 1 | Aminocaproic acid | 0.1 | 2.66 | 1.6 |
| 2 | do | | | |
| 3 | AH salt | | 2.72 | 0.9 |
| 4 | do | 0.5 | 2.66 | 1.8 |
| 5 | do | | 2.68 | 1.3 |

EXAMPLE 2

10 kg. of a colourless polycaprolactam which has been prepared in the usual way with the use of aminocaproic acid as catalyst and a relative viscosity (measured in 1% by weight solution of the polyamide in m-cresol at 25° C. in an Ubbelohde viscosimeter) of 3.05 and a monomer- and oligomer content (measured by extraction of the granulate with hot methanol) of 0.9% are melted in a conventional extruder and at the same time homogeneously mixed with 0.1% polyvinylpyrrolidone having an average molecular weight of about 1,000,000. The polyamide is then spun into a bristle, chopped into a granulate and dried. A comparative test is carried out in the same way but without the addition of polyvinyl pyrrolidone.

Both products are injection moulded into wedge-shaped strips as described in Example 1.

The polyamide which contains polyvinyl pyrrolidone yields wedge-shaped strips which are transparent up to a

EXAMPLE 4

According to Example 1 caprolactam is polymerised with the addition of (a) 0.1 and (b) 0.5% by weight of polyvinyl pyrrolidone having an average molecular weight of about 800,000.

For comparison purposes the same polymerisation is carried out with (c) 0.1 and (d) 0.5% by weight of polyvinyl pyrrolidone having an average molecular weight of about 40,000.

The resulting polycaprolactam is processed as in Example 1 to the same wedge shaped articles (length 190 mm., width 35 mm.; section 0.5 to 2 mm.).

The results of the experiments are summarised in Table II.

TABLE II

| Serial No.: | Catalyst | Polyvinyl pyrrolidone percent by weight | Mol. weight | Relative viscosity of the polyamide | Layer thickness up to which the wedge-shaped strip is transparent, mm. |
|---|---|---|---|---|---|
| a | Aminocaproic acid | 0.1 | ¹ 800,000 | 2.75 | 1.5 |
| b | do | 0.5 | ¹ 800,000 | 2.71 | 7.1 |
| c | do | 0.1 | ¹ 40,000 | 2.66 | 0.7 |
| d | do | 0.5 | ¹ 40,000 | 2.49 | 1.1 |

¹ About.

What we claim is:

1. A polyamide composition of improved transparency formed from a polyamide-forming starting material selected from the group consisting of: (1) dicarboxylic acids and diamines and their polyamide-forming derivatives; and (2) amino carboxylic acids and their polyamide-forming derivative, said polyamide composition containing 0.001 to 10% by weight of a polyvinyl pyrrolidone having a molecular weight of at least about 800,000, said proportions being based on the total weight of the polyamide composition.

2. A method for the production of polyamides with improved transparency, which comprises polymerizing a polyamide-forming material selected from the group consisting of: a dicarboxylic acid and a diamine and their polyamide-forming derivatives; and (2) an amino carboxylic acid and its polyamide-forming derivatives, in the presence of 0.001 to 10% by weight of a polyvinyl pyrrolidone having a molecular weight of at least about 800,000.

3. The method of claim 2 in which the pyrrolidone is present in the range of 0.01 to 10%.

4. The composition of claim 1 in which the molecular weight of the pyrrolidone is about 800,000 to 1,000,000.

References Cited

UNITED STATES PATENTS

| | | | |
|---|---|---|---|
| 3,036,988 | 5/1962 | Knospe | 260—857 |
| 3,211,807 | 10/1965 | Gillies | 260—857 |
| 3,287,441 | 11/1966 | Magat | 260—857 |

PAUL LIEBERMAN, Primary Examiner

U.S. Cl. X.R.

260—78